Figure 1:
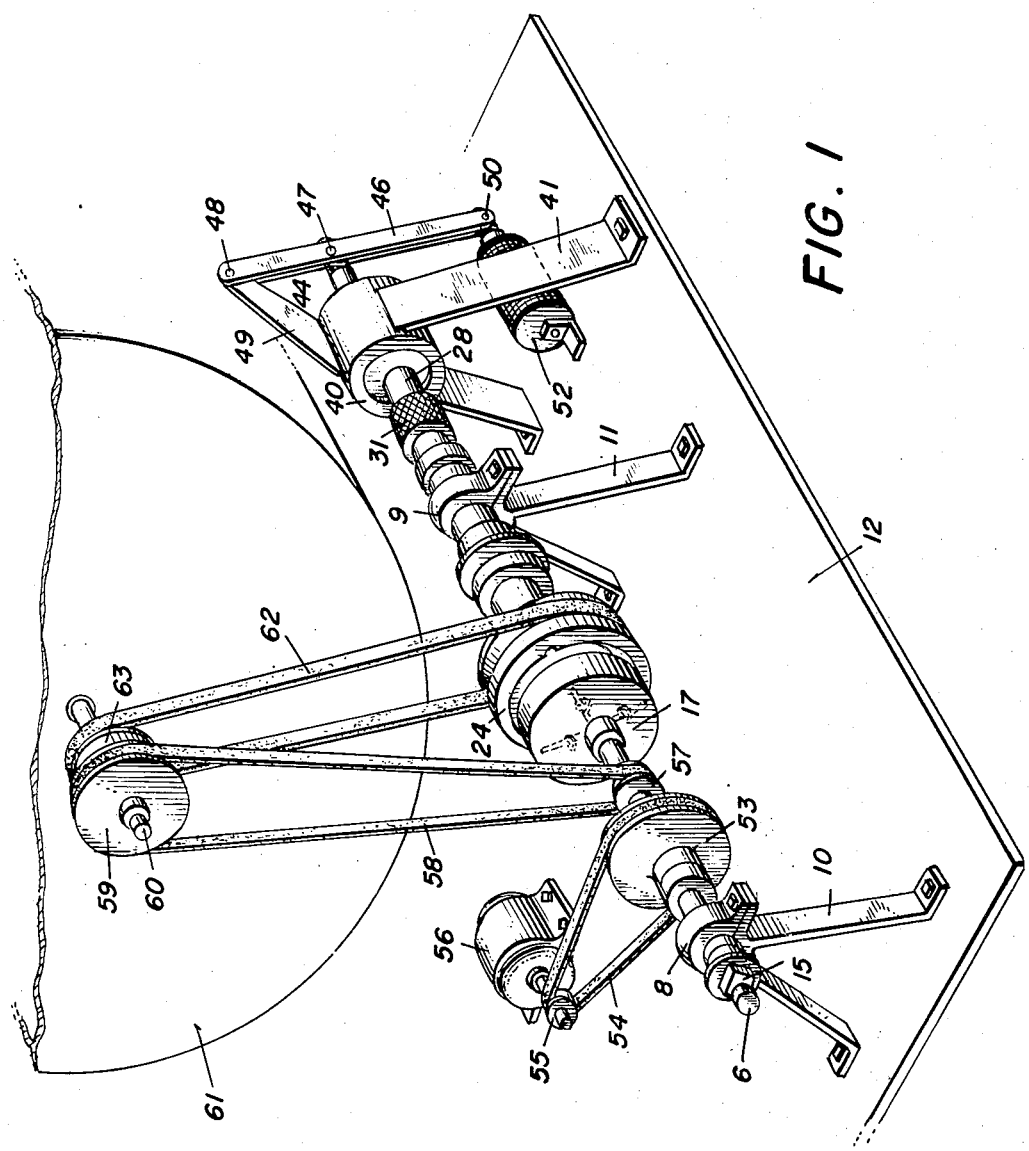

April 1, 1958

G. M. THORNTON 2,828,845

VARIABLE SPEED TRANSMISSION

Filed Jan. 28, 1954

2 Sheets-Sheet 1

INVENTOR
GARNETT M. THORNTON

BY *Ralph Burch*

ATTORNEY

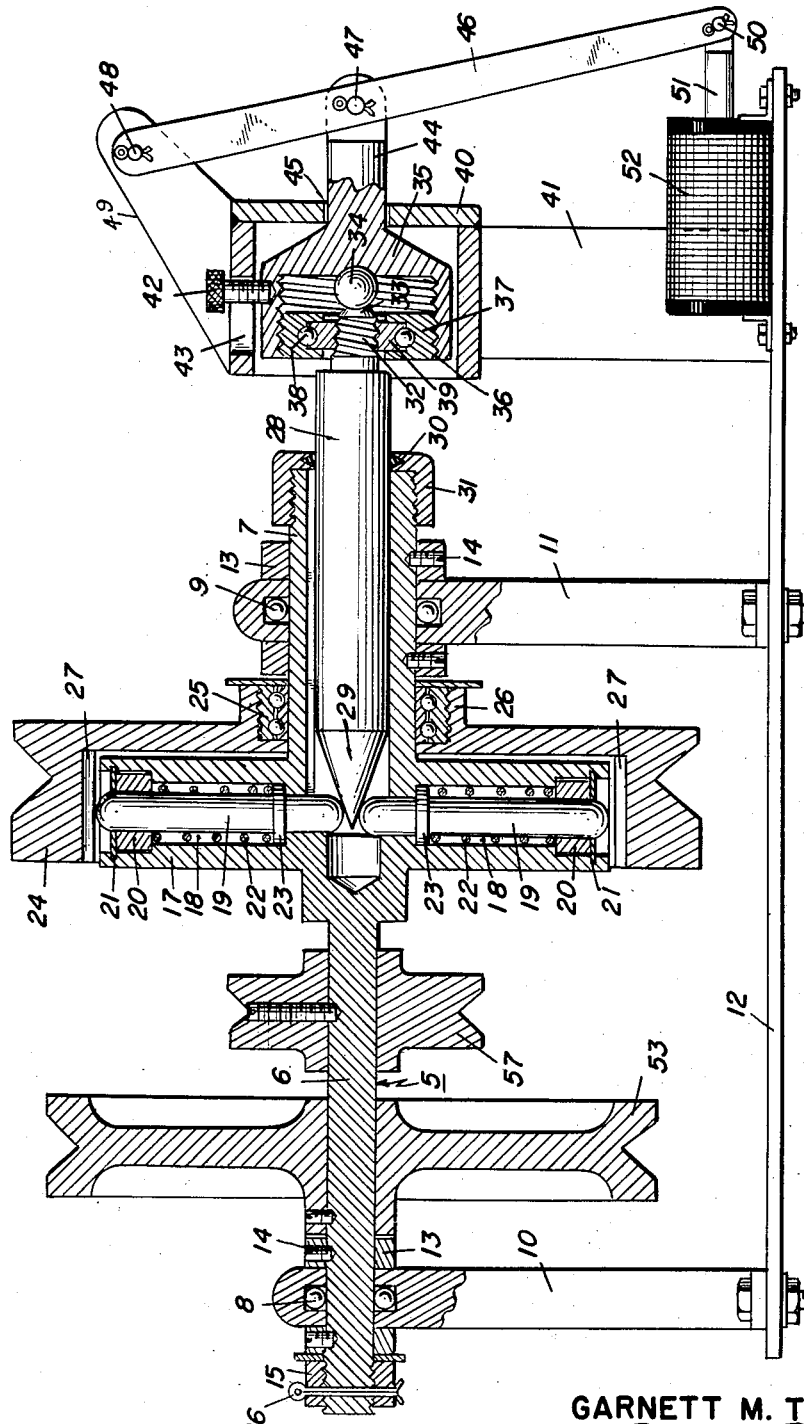

United States Patent Office 2,828,845
Patented Apr. 1, 1958

2,828,845

VARIABLE SPEED TRANSMISSION

Garnett M. Thornton, Winfield, Ala.

Application January 28, 1954, Serial No. 406,734

4 Claims. (Cl. 192—96)

This invention relates to a variable speed transmission for apparatus such as automatic washing machines and the like.

It is an object of the invention to provide a variable speed belt transmission having high and low speed pulleys for driving the rotatable cylinder of a washing machine, with means for connecting and disconnecting the high speed from the drive shaft to control the speed of the cylinder.

A further object of the invention resides in providing a belt transmission having low and high speed pulleys, the latter being releasably connected to the drive shaft by a clutch operable by a solenoid to connect and disconnect the high speed pulley.

Another object of the invention resides in providing a variable speed transmission composed of relative few parts, that is quiet in operation and economical to manufacture.

Other objects and advantages of the invention will be apparent during the course of the following description.

In the accompanying drawings forming a part of this specification and in which like numerals are employed to designate like parts throughout the same, Fig. 1 is a perspective view of the transmission as applied to the rotating cylinder of a washing machine, and, Fig. 2 is a longitudinal sectional view of the transmission.

Referring to the drawings wherein for the purpose of illustration a preferred embodiment of the invention is shown the numeral 5 denotes generally a drive shaft having a solid section 6 and tubular section 7, rotatably mounted in roller bearings 8 and 9 of standards 10 and 11 mounted on a base member 12. Spacing washers 13 are fixed on the shaft on opposite sides of the standards 10 and 11 by set screws 14 and a lock nut 15 is threaded on the free end of the solid section 6 and is held in locked position by a cotter pin 16 extending through the nut and shaft. A circular clutch housing 17 is formed integral with the inner end of tubular section 7 having a plurality of radial passages 18 to receive lock pins 19. The lock pins are slidably mounted in the passages 18 having their upper ends fitted in guide collars 20 and their lower ends extending into the bore of the tubular section 7 of drive shaft 5. The collars 20 are retained in the passages by retainer washers 21 and coil springs 22 are mounted on the lock pins between the collars 20 and flanges 23 formed integral with the lock pins. A grooved high speed pulley 24 surrounds the periphery of the clutch housing 17 being rotatably mounted by a bearing collar 25 on the tubular section 7 of drive shaft 5, the bearing collar being threadedly mounted in the hub 26 of the pulley 24. The inner periphery of pulley 24 is provided with a series of transverse slots 27 adapted to be engaged by the lock pins 19 when the latter are moved outwardly whereby the high speed pulley 24 is connected to the drive shaft for rotation therewith.

A plunger 28 for moving the lock pins outwardly is slidably mounted in the bore of tubular section 7 having a tapered inner end 29 for sliding contact with the inner ends of the lock pins. The outer end of plunger 28 extends through a grease seal 30 carried by a cap 31 threaded on the end of tubular section 7 and terminates in a reduced screw-threaded portion 32 having a concave end 33 to provide a seat for shock ball 34. The ball 34 is disposed between the reduced end of plunger 28 and a cup shaped member 35 having internal screw threads 36 for engagement with the outer race 37 of a ball bearing 38, the inner race 39 of the bearing being threaded on the portion 32 of the plunger. The member 35 is slidably disposed in a housing 40 supported by a standard 41 and is limited in its movement by screw 42 carried by the member and extending through the longitudinal slot 43 in housing 40. A rod 44 extending from member 35 passes through an opening 45 in the wall of housing 40 and is pivotally connected to a lever 46, as at 47. The upper end of lever 46 is pivotally connected at 48 to a bracket 49 extending from the top of housing 40, and the lower end of lever 46 is pivotally connected, at 50, to rod 51 actuated by a solenoid 52.

A drive pulley 53 is fixedly mounted on the section 6 of drive shaft 5 and is connected by belt 54 to pulley 55 on the shaft of electric motor 56 which drives shaft 5 at a constant speed. A low speed pulley 57 is fixed on drive shaft 5 and is connected by belt 58 to pulley 59 on the shaft 60 of a washing machine cylinder 61. The high speed pulley 24 is connected by belt 62 to pulley 63 on shaft 60 of the washing machine cylinder.

In operation, the drive shaft 5 is driven at a constant speed by motor 56 and power from the drive shaft 5 is transmitted to the washing machine cylinder shaft 60 either through the low speed pulley 57 or high speed pulley 24, which pulleys are connected with the shaft 60 through belts 58 and 62 respectively. The high speed pulley 24 may be readily connected or disconnected from the drive shaft by operation of the plunger 28 which is controlled by the solenoid 52. When the solenoid is energized it actuates the rod 51 to swing the lever 46 and actuate the piston 35 to move the plunger longitudinally of the tubular section 7 of drive shaft 5. Upon movement of the plunger the tapered end 29 forces the lock pins 19 outwardly against the tension of coil springs 22 so that the outer ends of the pins engage in the slots 27 thus connecting the high speed pulley to the clutch housing 17 so that it turns therewith. When the solenoid 52 is de-energized the compressed springs 22 force the lock pins inwardly releasing the high speed pulley from connection with the clutch housing and at the same time move the plunger 28 outwardly to an inoperative position. Thus, it is seen a simple and highly efficient variable speed transmission is provided for transmitting power from a drive shaft to a driven shaft at low or high speeds which is composed of relatively few parts and may be manufactured at a low cost.

It is to be understood that the form of my invention herein shown and described is to be taken as a preferred example of the same and certain changes in the construction and arrangement of parts may be made without departing from the spirit of the invention or scope of the subjoined claims.

Having thus described my invention, I claim:

1. A clutch mechanism comprising a drive shaft having a bore in one end, an annular clutch housing carried by said shaft having a series of radial bores communicating with the bore of said shaft and opening through the periphery of said housing, lock pins slidably mounted in the bores of said housing, expansion springs mounted on said pins normally moving said pins inwardly, a pulley rotatably mounted on said shaft having a flange surrounding the periphery of said clutch housing, said flange having slots in its inner periphery adapted to receive said lock pins when moved outwardly, a plunger movable longitudinally in the bore of said shaft having a tapered end in contact with the inner ends of said lock pins, a reciprocating cup shaped member in alinement with the outer end of said plunger, an adjustable bearing in the end of said cup shaped member rotatably supporting the outer end of said plunger, and a solenoid for moving said cup shaped member to move said plunger inwardly whereby the tapered end moves said pins outwardly into locking engagement with the slots of the pulley flange.

2. A clutch mechanism as described in claim 1 wherein said bearing is threadedly mounted in said cup shaped member for longitudinal adjustment.

3. A clutch mechanism as described in claim 1 wherein a thrust ball is disposed between the outer end of said plunger and said cup shaped member.

4. A clutch mechanism comprising a drive shaft having a bore in one end, an annular clutch housing carried by said shaft having a series of radial bores communicating with the bore of said shaft and opening through the periphery of said housing, lock pins slidably mounted in the bores of said housing, expansion springs mounted on said pins normally moving said pins inwardly, a pulley rotatably mounted on said shaft having a flange surrounding the periphery of said clutch housing, said flange having slots in its inner periphery adapted to receive said lock pins when moved outwardly, a plunger movable longitudinally in the bore of said shaft having a tapered end in contact with the inner ends of said lock pins, a reciprocating cup shaped member in alinement with the outer end of said plunger, a bearing threadedly mounted in the end of said cup shaped member rotatably supporting the outer end of said plunger, a fixed housing supporting said cup shaped member, a lever pivotally connected at one end to said housing and extending transversely of the longitudinal axis of said cup shaped member, a rod extending from said cup shaped member pivotally connected to said lever intermediate its ends, and a solenoid connected to said lever for actuating the lever to reciprocate said cup shaped member and actuate said plunger.

References Cited in the file of this patent

UNITED STATES PATENTS

| | | |
|---|---|---|
| 93,798 | Bigelow | Aug. 17, 1869 |
| 1,371,187 | Pulliam | Mar. 8, 1921 |
| 2,063,426 | Galvin | Dec. 8, 1936 |
| 2,251,588 | Gilbert | Aug. 5, 1941 |
| 2,374,360 | Lawson | Apr. 24, 1945 |
| 2,427,493 | Bullard | Sept. 16, 1947 |
| 2,474,789 | Perhacs | June 28, 1949 |
| 2,538,667 | Chamberlin | Jan. 16, 1951 |
| 2,568,134 | Tharpe | Sept. 18, 1951 |
| 2,728,320 | Kloss | Dec. 27, 1955 |